June 9, 1942.   H. M. OTTO   2,286,005
LIQUID-GAS SEPARATING ARRANGEMENT
Filed Jan. 24, 1941   2 Sheets-Sheet 1
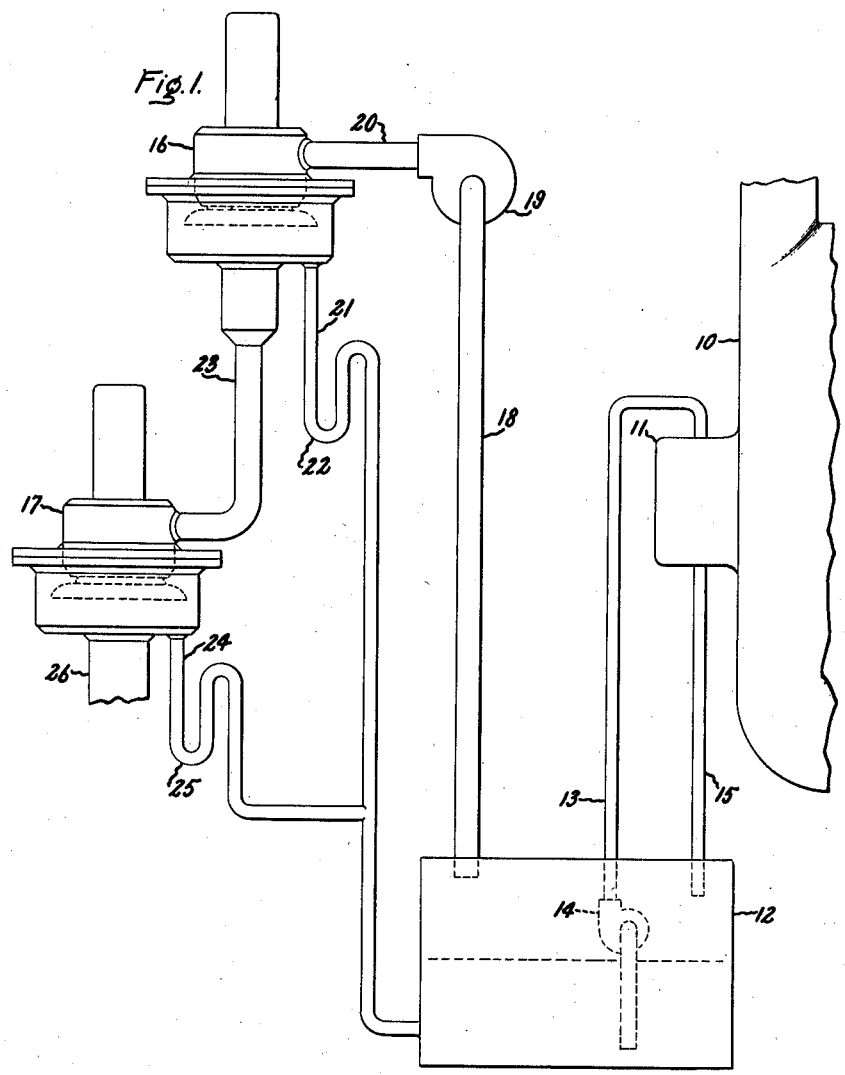
Inventor:
Harold M. Otto,
by Harry E. Dunham
His Attorney.

June 9, 1942. H. M. OTTO 2,286,005
LIQUID-GAS SEPARATING ARRANGEMENT
Filed Jan. 24, 1941 2 Sheets-Sheet 2
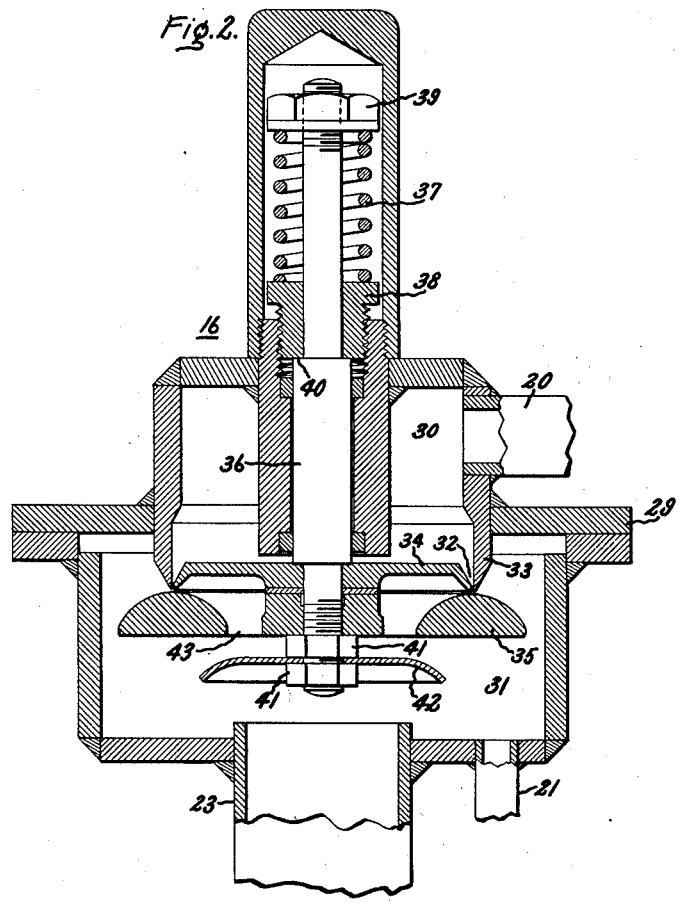
Inventor:
Harold M. Otto,
by Harry E. Dunham
His Attorney.

Patented June 9, 1942

2,286,005

UNITED STATES PATENT OFFICE 2,286,005

LIQUID-GAS SEPARATING ARRANGEMENT

Harold M. Otto, Schenectady, N. Y., assignor to General Electric Company, a corporation of New York Application January 24, 1941, Serial No. 375,830

5 Claims. (Cl. 183—107)

The present invention relates to separating arrangements, more specifically to oil extractors for removing oil entrained in air or like gas, although it is not necessarily limited thereto. Such arrangements are used, for example, in power plants in which oil used for lubricating and other purposes contains a considerable amount of air when discharged from the devices or ports being lubricated to a tank. Also, in plants in which pumps are used for returning oil or like operating fluid from bearings and other devices to an oil tank, the pumps often remove from such devices a considerable amount of air with oil entrained therein and it becomes important to separate the oil or other operating fluid from the air or like gas.

The object of my invention is to provide an improved construction of liquid-gas separating arrangements whereby the separation of liquid entrained in a gas may be accomplished efficiently and economically.

For a consideration of what I believe to be novel and my invention, attention is directed to the following description and the claims appended thereto in connection with the accompanying drawings.

In the drawings Fig. 1 shows a power plant arrangement embodying my invention; and Fig. 2 shows an enlarged view of a liquid vapor separating device used in the arrangement of Fig. 1.

The power plant arrangement as shown in Fig. 1 comprises an elastic fluid turbine 10 which has an element, in the present example a bearing 11, requiring lubricating oil during operation. Oil is supplied to the bearing 11 from a tank 12 by means of a conduit 13 including a pump 14. Oil is returned from the bearing 11 to the tank 12 by a return or drain conduit 15. During operation a considerable amount of air with oil entrained therein in the form of small droplets passes from the bearing 11 through the conduit 15 to the tank 12, occupying the space above the level of the oil therein. My invention comprises an improved system for separating the oil and the air thus passed to the tank 12. This system in the present example includes two series-connected separators 16 and 17 which may be alike in structure. Air with entrained oil is removed from the tank 12 by means of a conduit 18 and a pump 19, which latter has a discharge conduit 50 connected to an inlet conduit 20 of the first separator 16. As will be more fully described hereafter the separator 16 effects separation of oil and air. The oil is discharged through an oil discharge conduit 21 including a liquid seal 22 and connected to the tank 12. The air which may have some entrained oil is discharged through an air discharge conduit 23 connected to the inlet of the second separator 17. The latter effects a further separation and has an oil discharge conduit 24 with a liquid seal 25 connected to the aforementioned conduit 21 and a conduit 26 for discharging air to the atmosphere.

The separator 16, as shown more in detail in Fig. 2, comprises a casing 29 forming an upper or inlet chamber 30 for receiving air containing entrained oil through the inlet conduit 20 and a lower or outlet chamber 31 from which oil is discharged through the conduit 21 and air is discharged through the centrally arranged conduit 22. The flow of fluid from the inlet chamber 30 to the outlet chamber 31 takes place through a ring nozzle 32 formed between a cylindrical wall 33 of the upper chamber and a disk or bottom 34 near the lower end of the inlet chamber 30. A liquid separating and collecting plate 35 is associated with the discharge end of the nozzle 32 and together with the nozzle plate 34 rigidly secured to a stem or spindle 36 projecting through the upper end of the chamber 30 and biased upward by a spring 37 held between an adjustable plug 38 secured to the casing 29 and a nut 39 fastened to the upper end of the spindle 36. The diameter of the spindle 36 is reduced at the upper end, thereby forming a shoulder 40 bearing against the lower end of the plug 38. The nozzle plate 34 and the collecting plate 35 are secured to the lower reduced portion of the spindle 36 by means of two nuts 41. A deflector 42 held between the nuts 41 covers the opening to the air discharge conduit 22.

The collecting plate 35 has an outer portion curved in cross section broadly constituting a ring curving away from the nozzle 32 and connected by a plurality of webs 43 to a central portion forming a hub secured to the aforementioned spindle 36. In a preferred embodiment as shown in the drawings the ring 43 has an upper convex-shaped surface when viewed from the nozzle 32. This surface curves away from the nozzle in both radially inward and outward directions. The mean diameter of the ring 35 is substantially equal to that of the nozzle 32.

During operation, air with entrained oil is discharged through the nozzle 32 and forced towards the upper curved surface of the collecting disk of ring 35. The collector disk serves a double function. It collects and removes oil droplets and also serves to restrict and turn the flow at right angles. The separation is then partly a centrifugal effect. The change of velocity and pressure at the constriction also produces a separating effect. The small droplets of oil entrained in the air thereby collect on the collector ring or disk 35 forming larger droplets which drop into the lower portion of the chamber 31 and are discharged therefrom through the oil discharge conduit 21. The aforementioned deflector 42 prevents oil drops from dropping into the air discharge conduit 22. The latter extends slightly into the chamber 31.

If the air in addition to oil also should contain solid ingredients which gradually might plug the narrow annular nozzle 33, pressure in the inlet chamber will gradually build up and as it rises beyond a certain value the nozzle plate 34 together with the spindle 36 is forced downward against the biasing force of the spring 37, thereby discharging solids that previously plugged the nozzle into the lower chamber 31.

The separating effect depends upon the pressure difference between the inlet and outlet chambers, the size of the opening of the nozzle 33, that is, for different pressures in the inlet chamber 30 the nozzle opening should be varied, and the curvature of the collecting disk 35. Such variation or adjustment takes place automatically in my device as the pressure in the inlet chamber 30 rises beyond a certain value. With the increase in pressure the nozzle plate 34 is forced downward against the biasing force of the spring 37, thereby increasing the opening of the ring nozzle 33 and thus maintaining substantially constant separating action on the collector plate or ring 35.

As a single separator shown in Fig. 2 may remove only as much as 95% of the oil entrained in air and more complete separation is desired, in some cases several such devices may be connected in series, that is, the air discharge conduit 22 of the device shown in Fig. 2 is connected to the inlet conduit of another device. In case of several series-connected separators, it is desirable to provide for different adjustments of the nozzle plates 34 of the different separators as shown in Fig. 1.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Liquid gas separating arrangement comprising a first chamber having an inlet for receiving a mixture of gas and liquid, a second chamber having an outlet for air and another outlet for liquid, a nozzle for discharging mixture from the first chamber into the second chamber, and a plate with a surface curving away from the nozzle and located in the second chamber to receive and collect liquid contained in the mixture, and adjustable means yieldingly supporting the plate.

2. Liquid gas separating arrangement comprising a first chamber having an inlet for receiving a mixture of gas and liquid, a second chamber having an outlet for air and another outlet for liquid, an adjustable ring nozzle for discharging mixture from the first chamber into the second chamber, a ring located in the second chamber having an upper surface closely spaced with the discharge of the nozzle, said surface curving away from the nozzle in radially inward and outward directions, and means securing together and yieldingly supporting a wall of the nozzle and the ring.

3. Liquid gas separating arrangement comprising a first chamber having an inlet for receiving a mixture of gas and liquid, a second chamber having an outlet for air and another outlet for liquid, the first chamber having a bottom and a side wall together defining a ring nozzle for discharging mixture from the first chamber into the second chamber, a collector ring having a mean diameter substantially equal to that of the nozzle being disposed in the second chamber with an upper substantially convex surface closely spaced with the nozzle, and adjustable means yieldingly supporting the bottom and the ring.

4. Liquid gas separating arrangement comprising a casing forming a first chamber having an inlet for receiving a mixture of gas and liquid and a second chamber having an outlet for air and another outlet for liquid, the first chamber having a bottom and a side wall together defining a ring nozzle for discharging mixture from the first chamber into the second chamber, a collector ring disposed in the second chamber with an upper curved surface closely spaced with the nozzle, adjustable means yieldingly supporting the bottom and the ring, said means comprising a spindle secured to the bottom and to the ring, and adjustable means supporting the spindle on the casing and biasing it towards an end position.

5. Liquid gas separating arrangement comprising a first chamber having an inlet for receiving a mixture of gas and liquid, a second chamber having an outlet for air and another outlet for liquid, an adjustable nozzle for discharging mixture from the first chamber into the second chamber, said nozzle having a cylindrical wall and a conical wall adjacent thereto, means yieldingly supporting one of the walls to permit an increase of the nozzle area upon a predetermined increase in pressure in the first chamber, and an adjustable plate with a surface curving away radially inward and outward from the nozzle and located in the second chamber to collect liquid contained in the mixture.

HAROLD M. OTTO.